(12) United States Patent
Kolegayev et al.

(10) Patent No.: US 9,258,175 B1
(45) Date of Patent: Feb. 9, 2016

(54) METHOD AND SYSTEM FOR SHARING PLAYLISTS FOR CONTENT STORED WITHIN A NETWORK

(75) Inventors: Vladislav Kolegayev, Los Angeles, CA (US); Romulo Pontual, Hermosa Beach, CA (US); Robert G. Arsenault, Redondo Beach, CA (US); Eugene Suharev, Marina Del Ray, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 988 days.

(21) Appl. No.: 12/789,836

(22) Filed: May 28, 2010

(51) Int. Cl.
*G06F 15/16* (2006.01)
*H04L 29/08* (2006.01)
*G06F 12/00* (2006.01)

(52) U.S. Cl.
CPC ................. *H04L 29/08072* (2013.01)

(58) Field of Classification Search
USPC ............. 709/231–232, 250; 386/125
See application file for complete search history.

(56) References Cited

U.S. PATENT DOCUMENTS

| | | | |
|---|---|---|---|
| 4,485,219 A | 11/1984 | Falk et al. | |
| 5,193,208 A | 3/1993 | Yokota et al. | |
| 5,333,091 A | 7/1994 | Iggulden et al. | |
| 5,455,630 A | 10/1995 | McFarland et al. | |
| 5,485,219 A | 1/1996 | Woo | |
| 5,532,735 A | 7/1996 | Blahut et al. | |
| 5,600,366 A | 2/1997 | Schulman | |
| 5,613,111 A | 3/1997 | Malatesta et al. | |
| 5,652,615 A | 7/1997 | Bryant et al. | |
| 5,661,516 A | 8/1997 | Carles | |
| 5,664,948 A | 9/1997 | Dimitriadis et al. | |
| 5,692,093 A | 11/1997 | Iggulden et al. | |
| 5,694,176 A | 12/1997 | Bruette et al. | |
| 5,696,866 A | 12/1997 | Iggulden et al. | |
| 5,724,472 A | 3/1998 | Abecassis | |
| 5,790,423 A | 8/1998 | Lau et al. | |
| 5,793,366 A | 8/1998 | Mano et al. | |
| 5,818,439 A | 10/1998 | Nagasaka et al. | |
| 5,848,397 A | 12/1998 | Marsh et al. | |

(Continued)

FOREIGN PATENT DOCUMENTS

| AU | 694568 | 3/1996 |
|---|---|---|
| DE | 19939410 A1 | 3/2001 |

(Continued)

OTHER PUBLICATIONS

Gotuit Video Slide Show; http://www.gotuit.com/slides/slide1.htm; printed Jun. 13, 2002.

(Continued)

*Primary Examiner* — Zarni Maung

(57) ABSTRACT

A system and method for sharing playlists within a network includes a first storage device having a first playlist comprising first playlist data corresponding to stored content and a second storage device having a second playlist comprising second playlist data corresponding to stored content. The system also includes an aggregation server in communication with the first storage device and the second storage device that receives the first playlist and the second playlist. The aggregation server aggregates the first playlist data and the second playlist data to form an aggregated playlist having aggregated playlist data and forms an index list corresponding to the aggregated playlist. A first aggregation client is in communication with the aggregation server and receives the index list from the aggregation server.

34 Claims, 13 Drawing Sheets

(56) References Cited

U.S. PATENT DOCUMENTS

| | | |
|---|---|---|
| 5,883,621 A | 3/1999 | Iwamura |
| 5,886,731 A | 3/1999 | Ebisawa |
| 5,892,536 A | 4/1999 | Logan et al. |
| 5,986,692 A | 11/1999 | Logan et al. |
| 5,987,210 A | 11/1999 | Iggulden et al. |
| 5,995,092 A | 11/1999 | Yuen et al. |
| 5,999,688 A | 12/1999 | Iggulden et al. |
| 6,005,861 A | 12/1999 | Humpleman |
| 6,026,398 A | 2/2000 | Brown et al. |
| 6,055,560 A | 4/2000 | Mills et al. |
| 6,147,714 A | 11/2000 | Terasawa et al. |
| 6,163,316 A | 12/2000 | Killian |
| 6,166,730 A | 12/2000 | Goode et al. |
| 6,167,393 A | 12/2000 | Davis, III et al. |
| 6,177,931 B1 | 1/2001 | Alexander et al. |
| 6,215,526 B1 | 4/2001 | Barton et al. |
| 6,226,444 B1 | 5/2001 | Goldschmidt Iki et al. |
| 6,233,389 B1 | 5/2001 | Barton et al. |
| 6,262,722 B1 | 7/2001 | Allison et al. |
| 6,269,394 B1 | 7/2001 | Kenner et al. |
| 6,288,716 B1 | 9/2001 | Humpleman et al. |
| 6,310,886 B1 | 10/2001 | Barton |
| 6,324,338 B1 | 11/2001 | Wood et al. |
| 6,327,418 B1 | 12/2001 | Barton |
| 6,351,270 B1 | 2/2002 | Nishikawa et al. |
| 6,360,053 B1 | 3/2002 | Wood et al. |
| 6,396,546 B1 | 5/2002 | Alten et al. |
| 6,452,611 B1 | 9/2002 | Gerba et al. |
| 6,456,308 B1 | 9/2002 | Agranat et al. |
| 6,477,705 B1 | 11/2002 | Yuen et al. |
| 6,480,889 B1 | 11/2002 | Saito et al. |
| 6,481,010 B2 | 11/2002 | Nishikawa et al. |
| 6,483,548 B1 | 11/2002 | Allport |
| 6,490,722 B1 | 12/2002 | Barton et al. |
| 6,505,348 B1 | 1/2003 | Knowles et al. |
| 6,507,951 B1 | 1/2003 | Wugofski |
| 6,564,380 B1 | 5/2003 | Murphy |
| 6,642,939 B1 | 11/2003 | Vallone et al. |
| 6,661,468 B2 | 12/2003 | Alten et al. |
| 6,671,454 B1 | 12/2003 | Kaneko et al. |
| 6,732,372 B2 | 5/2004 | Tomita et al. |
| 6,757,906 B1 | 6/2004 | Look et al. |
| 6,760,916 B2 | 7/2004 | Holtz et al. |
| 6,760,918 B2 | 7/2004 | Rodriguez et al. |
| 6,772,433 B1 | 8/2004 | LaJoie et al. |
| 6,839,769 B2 | 1/2005 | Needham et al. |
| 6,879,963 B1 | 4/2005 | Rosenberg |
| 6,922,845 B2 | 7/2005 | Yap et al. |
| 6,985,569 B2 | 1/2006 | Baker |
| 7,103,906 B1 | 9/2006 | Katz et al. |
| 7,143,353 B2 | 11/2006 | McGee et al. |
| 7,171,677 B1 | 1/2007 | Ochiai |
| 7,194,755 B1 | 3/2007 | Nakata et al. |
| 7,213,209 B2 | 5/2007 | Lueckhoff et al. |
| 7,277,870 B2 | 10/2007 | Mouad et al. |
| 7,290,211 B2 | 10/2007 | Goodwin et al. |
| 7,363,278 B2 | 4/2008 | Schmelzer et al. |
| 7,373,414 B2 | 5/2008 | Evron et al. |
| 7,477,833 B2 * | 1/2009 | Kato et al. .................. 386/241 |
| 7,519,590 B2 | 4/2009 | Chandrasekar et al. |
| 7,627,889 B2 | 12/2009 | Jaff et al. |
| 7,657,151 B2 | 2/2010 | Goodwin et al. |
| 7,665,111 B1 | 2/2010 | Barton et al. |
| 7,765,479 B2 | 7/2010 | Goodwin et al. |
| 7,779,445 B2 | 8/2010 | Ellis |
| 7,917,008 B1 | 3/2011 | Lee et al. |
| 8,442,387 B2 | 5/2013 | Goodwin et al. |
| 8,875,198 B1 | 10/2014 | Goodwin et al. |
| 2001/0013128 A1 | 8/2001 | Hagai et al. |
| 2001/0014891 A1 | 8/2001 | Hoffert et al. |
| 2001/0028782 A1 | 10/2001 | Ohno et al. |
| 2001/0054026 A1 | 12/2001 | Choate |
| 2002/0054062 A1 | 5/2002 | Gerba et al. |
| 2002/0065678 A1 | 5/2002 | Peliotis et al. |
| 2002/0069218 A1 | 6/2002 | Sull et al. |
| 2002/0087661 A1 | 7/2002 | Matichuk et al. |
| 2002/0092021 A1 | 7/2002 | Yap et al. |
| 2002/0092022 A1 | 7/2002 | Dudkicwicz et al. |
| 2002/0120925 A1 | 8/2002 | Logan |
| 2002/0124256 A1 | 9/2002 | Suzuka |
| 2002/0129358 A1 | 9/2002 | Buehl et al. |
| 2002/0133821 A1 | 9/2002 | Shteyn |
| 2002/0144275 A1 | 10/2002 | Kay et al. |
| 2002/0152474 A1 | 10/2002 | Dudkiewicz |
| 2002/0154892 A1 | 10/2002 | Hoshen et al. |
| 2002/0162109 A1 | 10/2002 | Shteyn |
| 2002/0174430 A1 | 11/2002 | Ellis et al. |
| 2002/0174444 A1 | 11/2002 | Gatto et al. |
| 2002/0178232 A1 | 11/2002 | Ferguson |
| 2003/0079227 A1 | 4/2003 | Knowles et al. |
| 2003/0093792 A1 | 5/2003 | Labeeb et al. |
| 2003/0095791 A1 | 5/2003 | Barton et al. |
| 2003/0101459 A1 | 5/2003 | Edson |
| 2003/0106062 A1 | 6/2003 | Shteyn et al. |
| 2003/0126598 A1 | 7/2003 | Agnihotri et al. |
| 2003/0167473 A1 | 9/2003 | Klosterman et al. |
| 2003/0208756 A1 | 11/2003 | Macrae et al. |
| 2004/0045020 A1 | 3/2004 | Witt et al. |
| 2004/0049787 A1 | 3/2004 | Maissel et al. |
| 2004/0083273 A1 | 4/2004 | Madison et al. |
| 2004/0117831 A1 | 6/2004 | Ellis et al. |
| 2004/0117837 A1 | 6/2004 | Karaoguz et al. |
| 2004/0128317 A1 | 7/2004 | Sull et al. |
| 2004/0128685 A1 | 7/2004 | Hassell et al. |
| 2004/0158853 A1 | 8/2004 | Doi et al. |
| 2004/0158856 A1 | 8/2004 | Grooters et al. |
| 2004/0170260 A1 | 9/2004 | Baker |
| 2004/0203639 A1 | 10/2004 | Ozer et al. |
| 2004/0223738 A1 | 11/2004 | Johnson |
| 2004/0236778 A1 | 11/2004 | Junqua et al. |
| 2004/0244038 A1 | 12/2004 | Utsuki et al. |
| 2004/0268390 A1 | 12/2004 | Ibrahim Sezan et al. |
| 2005/0028206 A1 | 2/2005 | Cameron et al. |
| 2005/0117461 A1 * | 6/2005 | Seo et al. .................. 369/30.08 |
| 2005/0154681 A1 | 7/2005 | Schmelzer |
| 2005/0160353 A1 | 7/2005 | Conrad et al. |
| 2005/0165795 A1 | 7/2005 | Myka et al. |
| 2005/0187943 A1 | 8/2005 | Finke-Anlauff et al. |
| 2005/0204388 A1 | 9/2005 | Knudson et al. |
| 2005/0216942 A1 | 9/2005 | Barton |
| 2005/0240295 A1 | 10/2005 | Vilcauskas et al. |
| 2005/0251827 A1 | 11/2005 | Ellis et al. |
| 2005/0256846 A1 | 11/2005 | Zigmond et al. |
| 2005/0273819 A1 | 12/2005 | Knudson et al. |
| 2005/0273827 A1 | 12/2005 | Javed et al. |
| 2005/0283810 A1 | 12/2005 | Ellis et al. |
| 2006/0085821 A9 | 4/2006 | Simmons et al. |
| 2006/0143054 A1 | 6/2006 | Taylor |
| 2006/0150123 A1 | 7/2006 | Goodwin et al. |
| 2006/0164930 A1 * | 7/2006 | Seo et al. .................. 369/30.1 |
| 2006/0184984 A1 | 8/2006 | Goodwin et al. |
| 2006/0200449 A1 * | 9/2006 | Pauws .............................. 707/3 |
| 2007/0136445 A1 | 6/2007 | Sweatt et al. |
| 2007/0147782 A1 * | 6/2007 | Shibata .......................... 386/95 |
| 2007/0244880 A1 * | 10/2007 | Martin et al. .................. 707/5 |
| 2007/0282819 A1 | 12/2007 | Lynn et al. |
| 2008/0059448 A1 | 3/2008 | Chang et al. |
| 2008/0086751 A1 | 4/2008 | Horn et al. |
| 2008/0255691 A1 | 10/2008 | Sutardja et al. |
| 2009/0030978 A1 | 1/2009 | Johnson et al. |
| 2009/0193451 A1 | 7/2009 | O'Neil |
| 2009/0204904 A1 | 8/2009 | Kaminski et al. |
| 2009/0222392 A1 * | 9/2009 | Martin et al. .................. 706/46 |
| 2011/0013885 A1 | 1/2011 | Wong et al. |
| 2014/0169770 A1 | 6/2014 | Knudson et al. |
| 2015/0012590 A1 | 1/2015 | Goodwin et al. |
| 2015/0012620 A1 | 1/2015 | Goodwin et al. |

FOREIGN PATENT DOCUMENTS

| | | |
|---|---|---|
| EP | 0693215 B1 | 11/1998 |
| EP | 0889647 A2 | 1/1999 |
| EP | 1071287 A2 | 1/2001 |
| EP | 1085443 A2 | 3/2001 |

(56) References Cited

FOREIGN PATENT DOCUMENTS

| | | |
|---|---|---|
| EP | 1107586 A2 | 6/2001 |
| EP | 1378911 A1 | 7/2004 |
| EP | 1549055 A1 | 6/2005 |
| JP | 07-021619 | 1/1995 |
| WO | 9904561 | 1/1999 |
| WO | 9952279 A1 | 10/1999 |
| WO | 9952285 | 10/1999 |
| WO | 0007368 A1 | 2/2000 |
| WO | 0018108 A2 | 3/2000 |
| WO | 0018108 A3 | 3/2000 |
| WO | 0028736 A1 | 5/2000 |
| WO | 0044171 | 7/2000 |
| WO | 0056072 | 9/2000 |
| WO | 0058833 A1 | 10/2000 |
| WO | 0058834 A1 | 10/2000 |
| WO | 0058967 A1 | 10/2000 |
| WO | 0059214 A1 | 10/2000 |
| WO | 0062298 A1 | 10/2000 |
| WO | 0062299 A1 | 10/2000 |
| WO | 0062533 A1 | 10/2000 |
| WO | 0067475 A1 | 11/2000 |
| WO | 0106370 A1 | 1/2001 |
| WO | 0122729 A1 | 3/2001 |
| WO | 0146843 A2 | 6/2001 |
| WO | 0147238 A2 | 6/2001 |
| WO | 0147249 A2 | 6/2001 |
| WO | 0147279 A2 | 6/2001 |
| WO | 0165762 A2 | 9/2001 |
| WO | 0165862 A2 | 9/2001 |
| WO | 0176249 A1 | 10/2001 |
| WO | 0189203 A2 | 11/2001 |
| WO | 2004084448 | 9/2004 |

OTHER PUBLICATIONS

Non-final Office action dated Sep. 3, 2013 in U.S. Appl. No. 12/797,664, filed Jun. 10, 2010 by Mark D. Goodwin et al.
Sonicblue Incorporated; ReplayTV 5000 User's Guide; 2002.
TIVO, Inc.; TIVO Viewer's Guide; Alviso, CA; 2002.
Canadian Office action dated Nov. 24, 2014 in Canadian Patent Application No. 2,594,238 filed Dec. 21, 2005 by Mark D. Goodwin et al.
Ohmata et al.; "A Metadata-based Environmental Adaptive Review System for Digital Broadcasting"; Local Computer Networks, Proceedings LCN 2002, 27th Annual IEEE Conference; Nov. 2002; Piscataway, New Jersey, USA; IEEE; pp. 325-326.
Lennox, Richard; "Development of an RDF/XLM based data model for bibliographic data"; School of Mathematical and Computer Sciences (MACS); 2004; XP002459430; Edinburgh, Scotland; retrieved from the Internet at http://66.102.1.104/scholar?hl+Fen&lr=&q=cache.sAlqKUM-NQJ:www.macs.hw.ac.uk/{ceerdI/Dissertation/dissertation.pdf on Nov. 21, 2007.

\* cited by examiner

Index Table

| Index Sorting Key | Playlist Holder Number | Receiving ID | Parent ID |
|---|---|---|---|
| A | B | C | D |
| 512 | 514 | 516 | 518 |

Cache Table

| Playlist Holder Number | Recording ID | Parent ID | Timestamp | Title | Description |
|---|---|---|---|---|---|
| G | H | I | J | K | L |
| 512 | 514 | 516 | 518 | 520 | 522 |

Aggregated Playlist

| DATE | TITLE | DESCRIPTION |
|------|-------|-------------|
| June 12 | Junior Golf Championship | Ben Mierzwa Hosts This Golf Classic |
| July 3 | Rock And Roll Concert | Charlie And The Hurricanes Live At The State Theatre |
| July 4 | Fireworks Over Detroit | Alexander Patrick Hosts The Star-Studded Event |

FIG. 11

METHOD AND SYSTEM FOR SHARING PLAYLISTS FOR CONTENT STORED WITHIN A NETWORK

TECHNICAL FIELD

The present disclosure relates generally communicating between a server and a client device, and, more specifically, to a method and system for displaying and communicating playlists for content available within a network.

BACKGROUND

The statements in this section merely provide background information related to the present disclosure and may not constitute prior art.

Satellite television has become increasingly popular due to the wide variety of content and the quality of content available. A satellite television system typically includes a set top box that is used to receive the satellite signals and decode the satellite signals for use on a television. The set top box typically has a memory associated therewith. The memory may include a digital video recorder or the like as well as storage for the operating code of the set top box. Because of the numerous components associated with the set top box, the set top box for each individual television is relatively expensive.

A satellite television or cable television system has a set top box associated with a television or display. The set top box is used to decode and process the signals. The set top box may also include a storage device, such as digital video recorder that stores content for later viewing. A list of content that is available from a set top box is referred to as a playlist. Typically, each set top box can only play content to the television or display associated with the set top box.

In more recent systems, a network or pseudo-network may allow content from one set top box to be displayed or played back through another set top box. One problem associated therewith is providing the other set top boxes with information available from the other set top boxes without unduly burdening the network.

SUMMARY

The present disclosure provides a system and method for providing a playlist index to clients on the server. The index contains less information than the entire playlist. The index thus requires less resources for storing the content within each client device. When the client device is about to view playlist data, the client device may obtain the playlist data and store the playlist data in a cache for subsequent viewing. The playlist data may only be maintained in the cache for a short amount of time when it is likely to be used.

In one aspect of the disclosure, a method includes forming a first playlist having first playlist data corresponding to stored content within a first storage device, forming a second playlist having second playlist data corresponding to stored content within a second storage device, communicating the first playlist and the second playlist to an aggregation server, aggregating the first playlist data and the second playlist data to form an aggregated playlist having aggregated playlist data, forming an index list corresponding to the aggregated playlist and communicating the index list to a first aggregation client.

In a further aspect of the disclosure, a system for sharing playlists within a network includes a first storage device having a first playlist comprising first playlist data corresponding to stored content and a second storage device having a second playlist comprising second playlist data corresponding to stored content. The system also includes an aggregation server in communication with the first storage device and the second storage device that receives the first playlist and the second playlist. The aggregation server aggregates the first playlist data and the second playlist data to form an aggregated playlist having aggregated playlist data and forms an index list corresponding to the aggregated playlist. A first aggregation client is in communication with the aggregation server and receives the index list from the aggregation server.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 6 is a diagrammatic view of an index table;

FIG. 7 is a diagrammatic view of a cache table;

FIG. 11 is a screen display illustrating an aggregated playlist displayed from an aggregation client;

DETAILED DESCRIPTION

Figure 1:
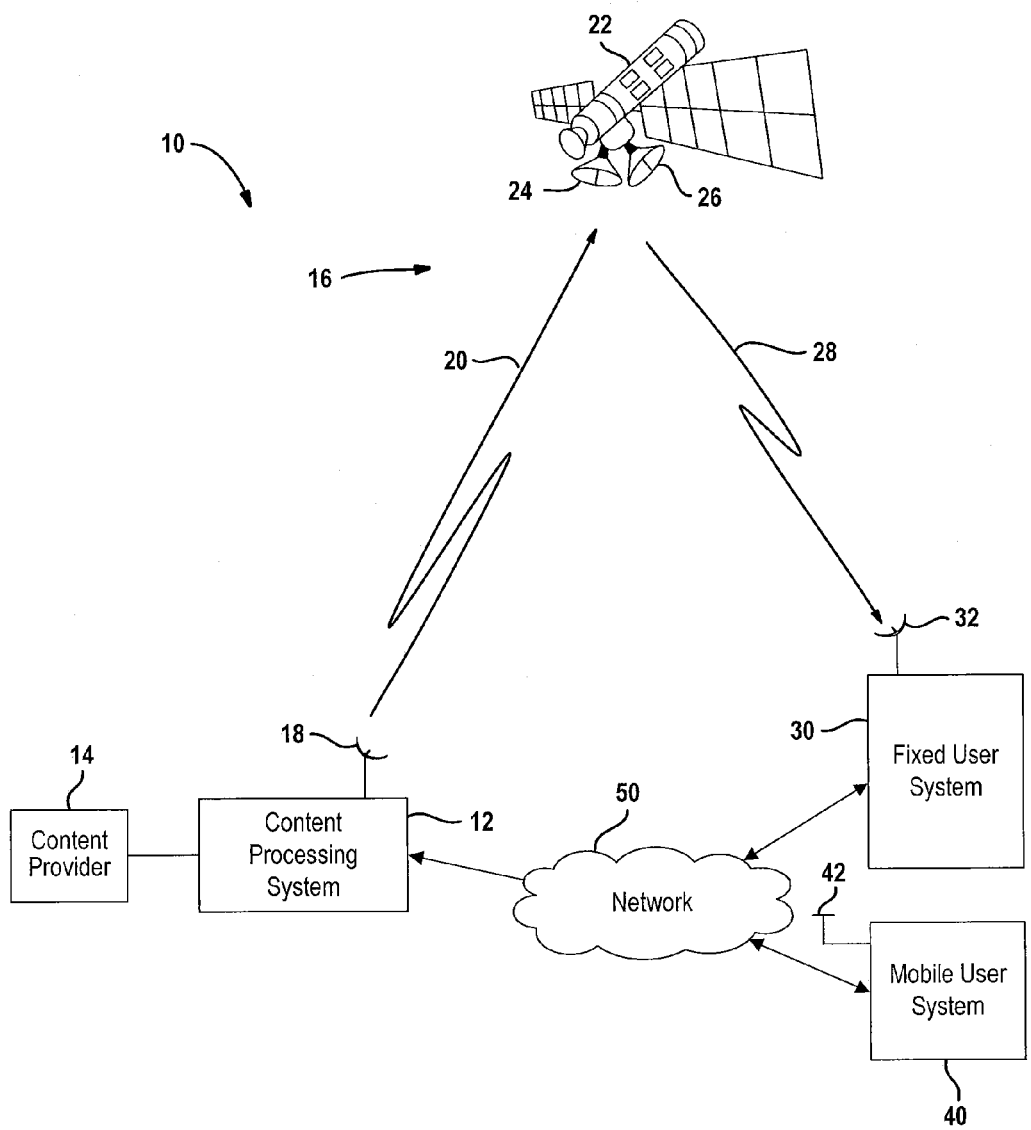
FIG. 1 is a high level block diagrammatic view of a satellite distribution system according to the present disclosure.

The following description is merely exemplary in nature and is not intended to limit the present disclosure, application, or uses. For purposes of clarity, the same reference numbers will be used in the drawings to identify similar elements. As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical OR. It should be understood that steps within a method may be executed in different order without altering the principles of the present disclosure.

The following system is described with respect to a satellite system. The communication system may be implemented in a terrestrial system such as a broadband system, cable system or telephone-type system. Optical fiber and wireless distribution may also be used in the broadband distribution system.

Further, many other types of content delivery systems are readily applicable to the disclosed systems and methods. For example, other wireless distribution systems, wired or cable distribution systems, cable television distribution systems, ultra-high frequency/very high frequency radio frequency systems, or other terrestrial broadcast systems may be used. Local multi-point distribution systems, Internet protocol—(IP) based distribution systems, cellular distribution systems, power-line broadcast systems, and point-to-point or multicast Internet protocol delivery networks may be used.

The following disclosure is made with respect to the delivery of video such as television, movies, music videos, and the like. It should also be understood that the systems and methods disclosed herein could also be used for the delivery of any media type, for example, audio, music, data, files, web pages, games, etc. Additionally, throughout this disclosure reference is made to data, information, program, movies, assets, video data, etc. However, it will be readily apparent that these terms are substantially equivalent in reference to the example systems and methods disclosed herein. Therefore, the present disclosure is applicable to the many types of content described above.

Referring now to FIG. 1, a communication system 10 is illustrated. Communication system 10 includes a content processing system 12 that is used as a processing and transmission source. A plurality of content providers 14, only one of which illustrated, may provide content to the content processing system 12. The content processing system 12 receives various types of content from a content provider 14 and communicates the content to system users.

The content processing system 12 communicates with various user systems through a content delivery system 16. The content delivery system 16 may be one of the various types of systems such as a wired, wireless, Internet Protocols, cable, high frequency system, etc. described above. In this case, a satellite system is illustrated but should not be considered limiting.

Carrying through with the satellite example, the content processing system 12 includes an antenna 18 for communicating processed content through an uplink 20 to a satellite 22. The satellite 22 may include a receiving antenna 24 and a transmitting antenna 26. The receiving antenna 24 receives the uplink signals 20 from the satellite antenna 18. The transmitting antenna 26 generates downlinks 28 and communicates the downlinks 28 to various user devices.

A fixed user system 30 receives the downlink signals 30 through a receiving antenna 32. The fixed user system 30 is a fixed user system meaning it is stationary. However, some components may be mobile components. The fixed user system 30 may be deployed within a building such as a single-family household, a multi-dwelling unit, or a business. Details of the fixed user system are provided below.

The present disclosure is also applicable to a mobile user system 40. The mobile user system 40 may include a satellite antenna 42. The satellite antenna 42 may be a tracking antenna to account for the mobility of the mobile user system. This is in contrast to the antenna 32 of the fixed user system that may be fixed in a single direction. The mobile user system 40 may include systems in airplanes, trains, buses, ships, and the like.

The fixed user system 30 and the mobile user system 40 may be in communication with a network 50. The network 50 may be a single network or a combination of different networks or different types of networks. The network 50 may, for example, be a broadband wired network or wireless network. The network 50 may be a one-way network so that data or content may be communicated from the fixed user system 30 or the mobile user system 40 through the network 50 to the content processing system 12 and the central distribution server 16. Likewise, the network 50 may also be one-way in the other direction so that the content distribution server 16 may communicate content data or other control signals such as a reset signal through the network 50 to the fixed user system 30 and the mobile user system 40. The network 50 may also be a two-way network so that communications may take place between the content processing system 12, which includes the distribution server 16, and the fixed user system 30 and the mobile user system 40.

Figure 2:
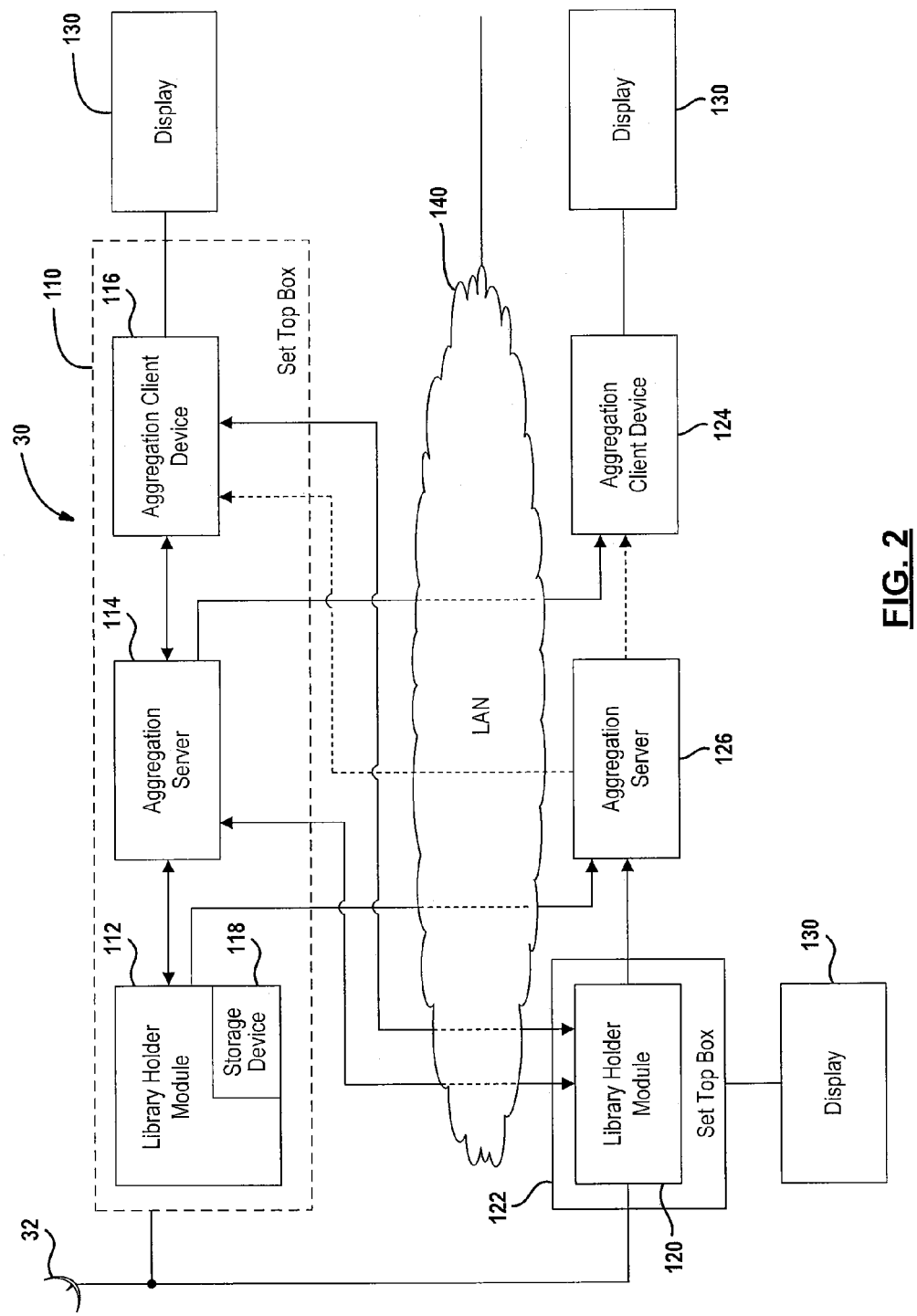
FIG. 2 is a block diagrammatic view of network having clients and servers according to their present disclosure.

Referring now to FIG. 2, a fixed user system 30 is further illustrated in further detail. While the fixed user system 30 is illustrated, the teachings here may also be applied to the mobile user system 40 illustrated in FIG. 1. It should also be noted that the fixed user system 30 includes various components by way of illustration. The numbers of components may vary depending upon the individual system. In this system, a set top box 110 is illustrated. The set top box 110 may include a library holder module 112, an aggregation server 114 and an aggregation client device 116. The library holder module 112 may have a storage device 118 associated therewith. The library holder module 112 may have a library of content and a playlist associated with the content stored therein. The stored content is available for playback from the storage device 118. The playlist is a list of the content that may include identifiers and informational data used by the storage device and other systems to locate the data and provide information regarding the data. The storage device 118 may receive content from the antenna 32 for storage within the storage device 118.

The library holder module 112 may have a playlist associated with the content within the storage device 118. The library holder module 112 may communicate the playlist to the aggregation server 114. The aggregation server 114 may also receive playlists from a second library holder 120 that may also be disposed within a set top box 122. The aggregation server 114 combines or aggregates the playlist from each of the library holder modules 112, 120 into an aggregated playlist.

The aggregated playlist within the aggregation server 114 may be used to generate an index table that is communicated to the aggregation client device 116. The index table has less data than the data in the play list. The index table is a list of data that corresponds to each item of the playlist. The index table includes indices used for identification and retrieval of data and full playlist descriptions and titles. The index table will be described in more detail below. Other aggregation client devices may also be in communication with the aggregation server 114. A second aggregation client device 124 is illustrated as receiving the index table from the aggregation server 114. Various numbers of aggregation client devices may be found within a user system.

Although the aggregation server 114 is illustrated within the set top box 110, the system does not necessarily include an aggregation server 114 within a set top box. An aggregation server 126 is illustrated outside of a set top box environment. The aggregation server 126 may, for example, be a stand-alone computer or file server. The aggregation server 126 may receive the playlist from the library holder module 112 and 120 and generate the index table. The aggregation server 126 may be used in place of the aggregation server 114. The aggregation server 126 may also be used together with the aggregation server 114 or another aggregation server located outside of the set top box 110. The aggregation server 126 may be a back up aggregation server that is used in place of the aggregation server 114 if the aggregation server 114 experiences communication difficulties or other difficulties.

As will be further described below, the aggregation client device 116 and 124 may have a display 130 associated therewith. The set top box 122 may also have a display 130 associated therewith. The display 130 may be a television or other type of monitor used for displaying content and menus to a user of the various devices.

The aggregation client devices 116, 124 may also be used for displaying an aggregated playlist from which a selection may be made to display content from one of the library holder modules 112, 120 within the user system 130. The aggregation client device 116, for example, may generate a selection from the aggregated playlist or the index associated with the aggregated playlist. The aggregation client device 116 may communicate the selection with the indices associated therewith to the aggregation server 114. The aggregation server 114 may then communicate with the library holder module 112, 120 based upon the indices. The aggregation server module will communicate the indices that may include the aggregation client device identifier to the library holder module. The library holder module may thus communicate content directly to the aggregation client device. That is, the content may be communicated directly to the aggregation client without being communicated through one of the aggregation servers.

The fixed user system 30 may also include a local area network 140. The local area network 140 may be an internet protocol (IP) network through which an index table may be communicated from the aggregation servers to the aggregation client devices, the library holder modules may communicate content directly to an aggregation client device.

Figure 3:
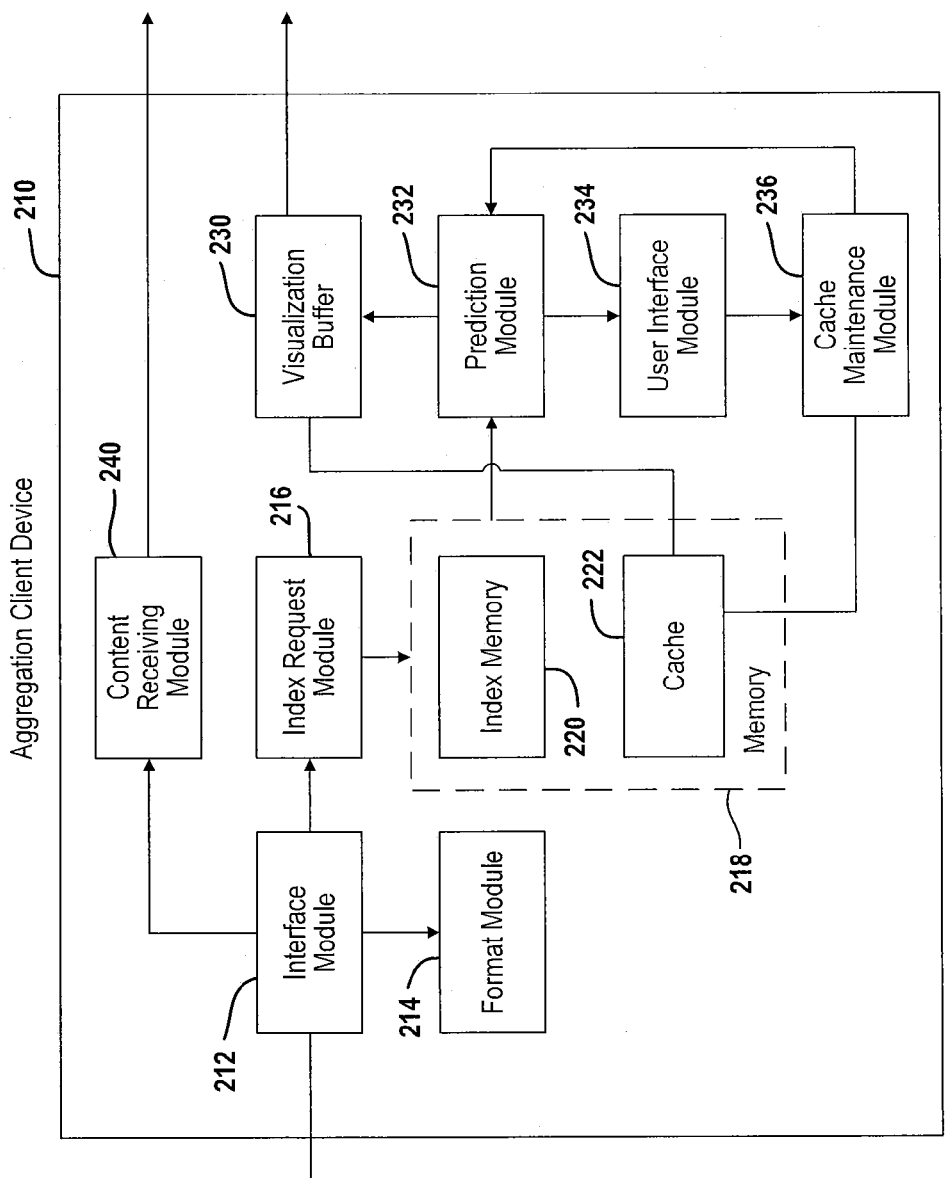
FIG. 3 is a block diagrammatic view of an aggregation client device.

Referring now to FIG. 3, an aggregation client device 210 is illustrated. The aggregation client device 210 may be the aggregation client device illustrated in FIG. 1 as referenced numerals 116 or 124. The aggregation client device 210 includes an interface module 212. The interface module 212 may control communications between the local area network 50 illustrated in FIG. 2 and the client device 210. The interface module 212 may communicate from the aggregation client device 210 using formatted signals from the format module 214. The format modules 214 may place any communication into a format desirable to communicate with the aggregation's server. As mentioned above, the aggregation client device 210 may receive an index table having indices therein from an aggregation server, playlist entries from the aggregation server and content from a library holder.

The interface module 212 may be in communication with an index request module 216. The index request module 216 may request an index or index update from the aggregation server. The index request module 216 when requesting an update may provide the last version of the update so that only updates from the last version forward may be provided. The index request module 216 may store the index in a memory 218. The memory 218 may include an index memory 220 and a cache memory 222. The index memory 220 may store the index table that corresponds to the index of the aggregated playlist.

The index table may not be displayed but rather playlist content may be displayed. A visualization buffer 230 may be provided that allows the aggregation client device 210 to display content on the display associated with the aggregation client device. The visualization buffer 230 may store data for displaying on the screen display. The visualization buffer 230 may also store additional data that corresponds to data that the prediction module 232 predicts that the user may eventually need to display the playlist material. The prediction module 232 is in communication with a user interface module 234. The user interface module 234 controls the aggregation client device in response to a remote control device or button pressing device. The user interface module 234 may provide key command signals to the prediction module 232 that predicts where the next block of data may be so that the request module 216 may request the playlist data that corresponds to the index data that may be required to be displayed. The playlist data that is retrieved from the aggregation server may be stored within the playlist cache 222. A cache maintenance module 236 may be in communication with the cache 222 and the prediction module 232. The cache maintenance module 236 may remove data from the cache that is no longer predicted to be or about to be displayed.

The aggregation client device 210 may also include a content receiving module 240. The content receiving module may receive content from a library holder. The content receiving module 240 may receive content and prepare the content for display on the display (illustrated in FIG. 2) associated with the aggregation client device. The content receiving module may demodulate or decode the signal depending upon the type of communication system between the library holder and the aggregation client.

Figure 4:
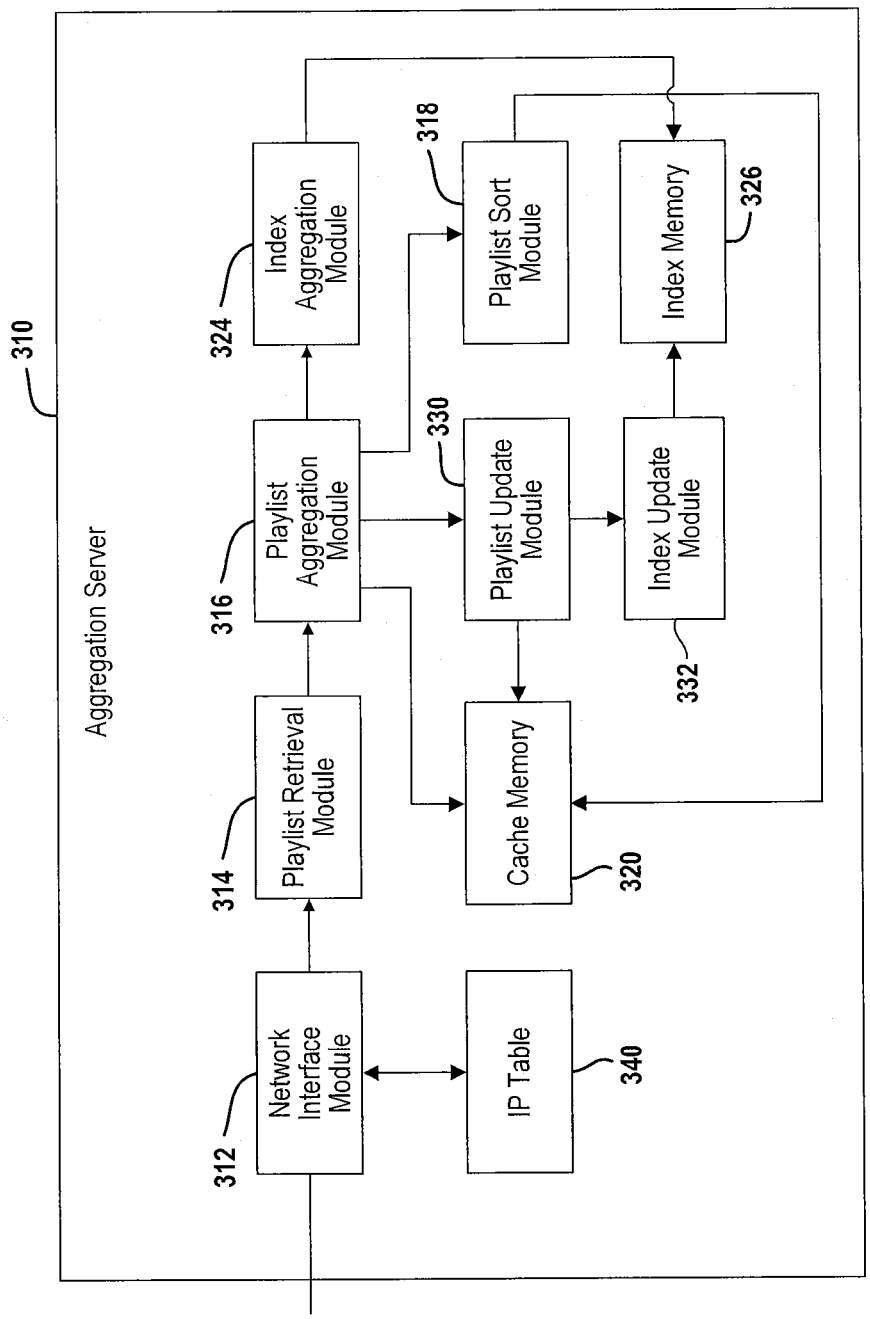
FIG. 4 is a block diagrammatic view of an aggregation server.

Referring now to FIG. 4, an aggregation server 310 is illustrated, the aggregation server 310 may be one of the aggregation servers 114, 126. The aggregation server 310 includes a network interface module 312 that is used for interfacing with the network 50 illustrated in FIG. 2. The network interface module 312 allows the aggregation server to communicate with both the library holders and the aggregation clients.

The aggregation server 310 may also include a playlist retrieval module 314 that is used for retrieving the playlists from the various library holders. Various formatting signals may be used to request the playlists from the library holders. The playlist retrieval module 314 may sequentially query the library holders so that the playlists may be retrieved.

A playlist aggregation module 316 is used to aggregate the playlist from the library holders. The playlist aggregation module 316 combines playlists from multiple library holders and forms one list therefrom. The playlist may include various informational data and locational data for the content stored with the storage devices on the network.

The playlist aggregation 316 may be in communication with a playlist sort module 318. The playlist sort module 318 may sort the playlist from the playlist aggregation module into a various order. The various order may include alphabetical or a time-based order. Other types of orders may also be provided. The playlist sort module 318 may also remove duplicates there from. The playlist sort module 318 may be provided to a memory such as a cache memory 320. The cache memory 320 may store the playlist sort module therein.

An index aggregation module 324 may also be included in the aggregation server 310. The index aggregation module 324 may generate an index table corresponding to the playlist entries. As mentioned above, the index table may include an extremely data shortened list that is easily provided to each of the aggregation clients. The index aggregation module 324 may store the index table in an index memory 326.

The aggregation server 310 may also be used to generate updates and communicate the updates to the individual aggregation clients. A playlist update module 330 may be used to determine playlist updates received from the library holders. The playlist update module 330 may generate a version number for the updates. An index update module 332 may generate an index corresponding to the updates to the playlist. The index updates may be stored in the index memory 326.

The aggregation server 310 may also include an IP table 340. The IP table may provide a way for the aggregation server to identify a library holder by an IP address. The IP address may include a significant number of bits and therefore may be too large to communicate in the index table to each aggregation client. Since only a limited number of aggregation clients, such as 10, may be provided in a system each aggregation client may merely be numbered with a one bit or two bit identifier. The IP table may be used by the aggregation server to look up the corresponding address of the library holders based upon the index table selection so that the content desired by the aggregation client may be requested from the library holder so it can be sent to the aggregation client directly.

Figure 5:
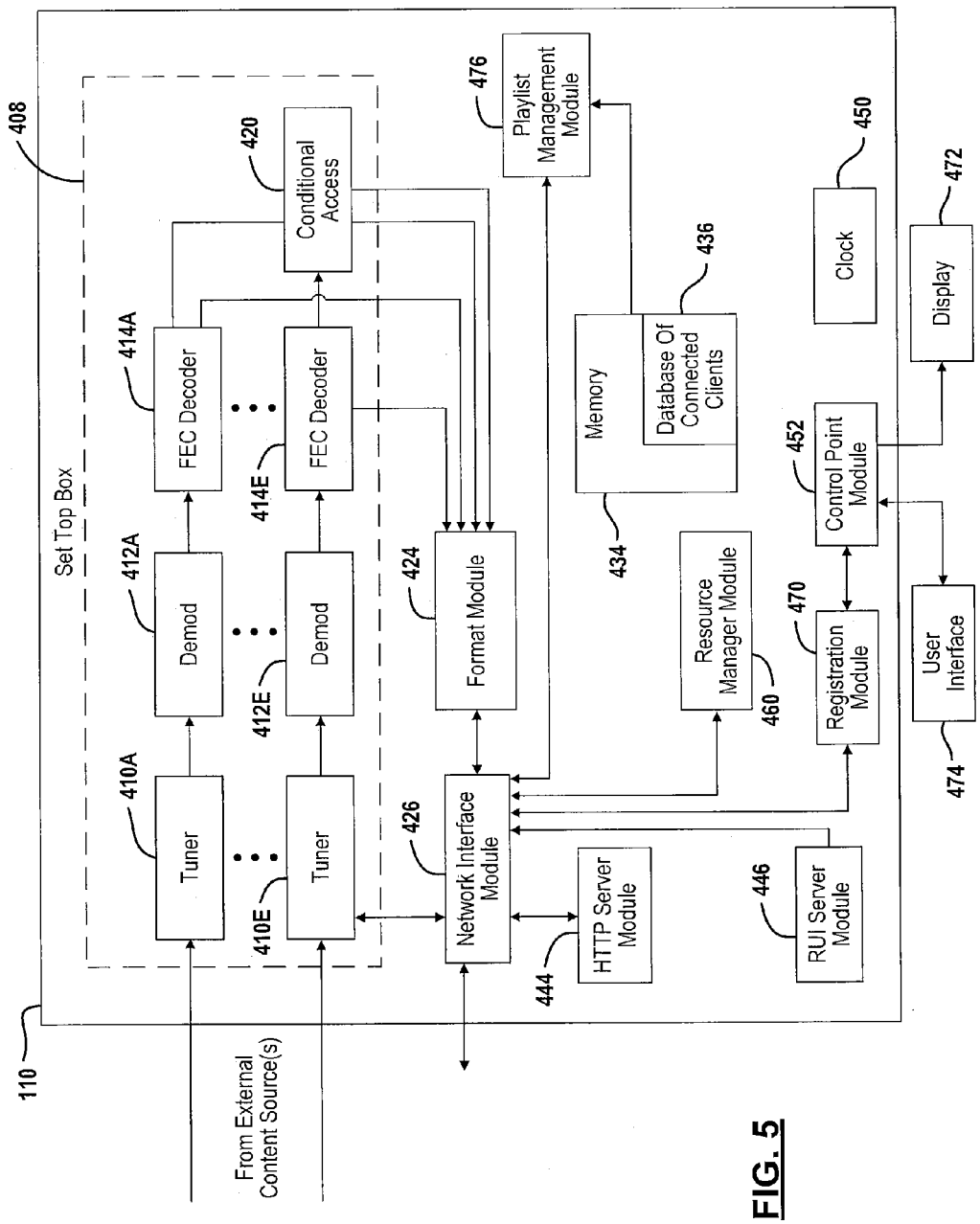
FIG. 5 is a block diagrammatic view of a set top box.

Referring now to FIG. 5, a set top box 110 is illustrated in further detail. The server 110 is used for communicating with aggregation servers 114 and aggregation client devices 116. The set top box device 110 may act as a set top box for various types of signals such as satellite signals or cable television signals. As mentioned above, the set top box 110 may be in communication with various external content sources such as satellite television, cable television, the Internet or other types of data sources.

A front end 408 may be provided for processing signals, if required. It is possible for some signals. When in communication with television sources, the front end 408 of the server device may include a plurality of tuners 410A-E, a plurality of demodulators 412A-E, a plurality of forward error correction decoders 414A-e and any buffers associated therewith. The front end 408 of the set top box 110 may thus be used to tune and demodulate various channels for providing live or recorded television ultimately to the client device 122. A conditional access module 420 may also be provided. The conditional access module 420 may allow the device to properly decode signals and prevent unauthorized reception of the signals.

A format module 424 may be in communication with a network interface module 426. The format module may receive the decoded signals from the decoder 414 or the conditional access module 420, if available, and format the signals so that they may be rendered after transmission through the local area network through the network interface module 426 to the client device.

A memory 434 may also be incorporated into the set top box 110. The memory 434 may be various types of memory or a combination of different types of memory. These may include, but are not limited to, a hard drive such as a digital video recorder, flash memory, ROM, RAM, keep-alive memory, and the like. The memory 434 may contain various data such as recorded content files.

An HTTP server module 444 may also be in communication with the network interface module 426. The HTTP server module 444 may allow the set top box 110 to communicate with the local area network. Also, the HTTP server module may also allow the server device to communicate with external networks such as the Internet.

A remote user interface (RUI) server module 446 may control the remote user interfaces that are provided from the set top box 110 to the client device 122.

A clock 450 may also be incorporated within the set top box 110. The clock 450 may be used to time and control the various communications with the various client devices 122.

A control point module 452 may be used to control and supervise the various functions provided above within the server device.

The set top box 110 may also include a resource manager module 460 that is in communication with a conflict resolver module 462. The resource manager module 460 may be in communication with a network interface module 426. The network interface module 426 may receive signals such as control signals or selection signals from various client devices. The resource manager module 460 may identify when a conflict arises from a conflict-causing request received from one of the client devices.

A conflict may arise when a concurrent view or service activity requires more resources than those available at the server device.

The set top box 110 may also include a registration module 470 in communication with the control point module 452. The registration module 470 may allow registration of a client device with the aggregation server device. Registration between an aggregation client device and a set top box 110 may be mandatory before the server device will provide content to the server device. The registration module 470 may be used to generate an identifier and display the identifier on a display 472. A registration mode may be entered through a user interface 474. The user interface may be a keypad on the server device or a graphical user interface that is displayed on the display 472. The user interface 474 may enter a registration mode and the registration module 470 may generate the identifier on the display 472. The network interface module 426 may receive a second identifier from a new or moved client device. The registration module 470 may compare the received identifier with the identifier that was displayed previously on the display 472. The client device may then be registered when the two identifiers are the same.

The set top box 110 may also include a playlist management module 472. The playlist management module 476 may be in communication with memory 434. The playlist management module 476 may be responsible for generating a playlist corresponding to the contents within the memory. As will be described below, the playlist may include various data that ultimately is used to form the aggregated playlist at the aggregation server. The playlist management module 476 may also be used for communicating the presence of updates of the playlists through the network interface module 426 to the aggregation server.

Referring now to FIG. 6, an index table 510 is illustrated. The index table 510 is illustrated as having a plurality of rows that correspond to each entry or content title in a playlist. In a data sense, the content of the index table may be fed in a preformatted stream to the aggregated client without having to use an actual "table." Only one row is illustrated in the present example and is populated by letters A-D which, in a practical environment may be numerals or other alpha-numeric identifiers. The index table 510 may include an index sorting key 512 that corresponds to a sort that may be performed. For example, the index sorting key may merely be a number in a list. That is, in an alphabetical list numeral 512 may correspond to the position within the list. The index sorting key may also correspond to a time of recording and therefore the numeral 512 may correspond to the time position within a list. More than one index sorting key may be provided.

The index table 510 may also include a playlist holder number 514. The playlist holder number corresponds to the address or identifier for the playlist holder.

The recording identifier 516 may be an identifier used to identify the recording by the library holder. The recording ID 516 may correspond only to the recording number within the library holder. A parent identifier 518 corresponds to the library holder file folder within which the content is stored.

Referring now to FIG. 7, a cache table 610 is illustrated. The cache table 610 may include various entries including a playlist holder number 612 that corresponds to the playlist holder number from the index table. The cache table 610 may also include a recording ID 614 that corresponds to the recording identifier 516 in the index table 510. A parent ID 616 may also correspond to the parent ID 518 illustrated in the index table.

In addition, the cache table may also include a time stamp 618 corresponding to the time that the content was recorded. A title 620 may also be provided. The title may include a full or abbreviated title for the content that is to be displayed on a screen display.

A description field 622 may also be included. A description field may include various data about the content including the actors or actresses, a genre, a description of the programming, a time of the programming, the network of the programming and other suitable data. As can be seen, the cache table provides much more information than the index table. Each content title of the playlist may include each of the categories of the cache table. Although, in certain embodiments not every one of the categories are required to be provided. As is demonstrated, the playlist and cache have a greater amount of data per content title than the index.

Figure 8:
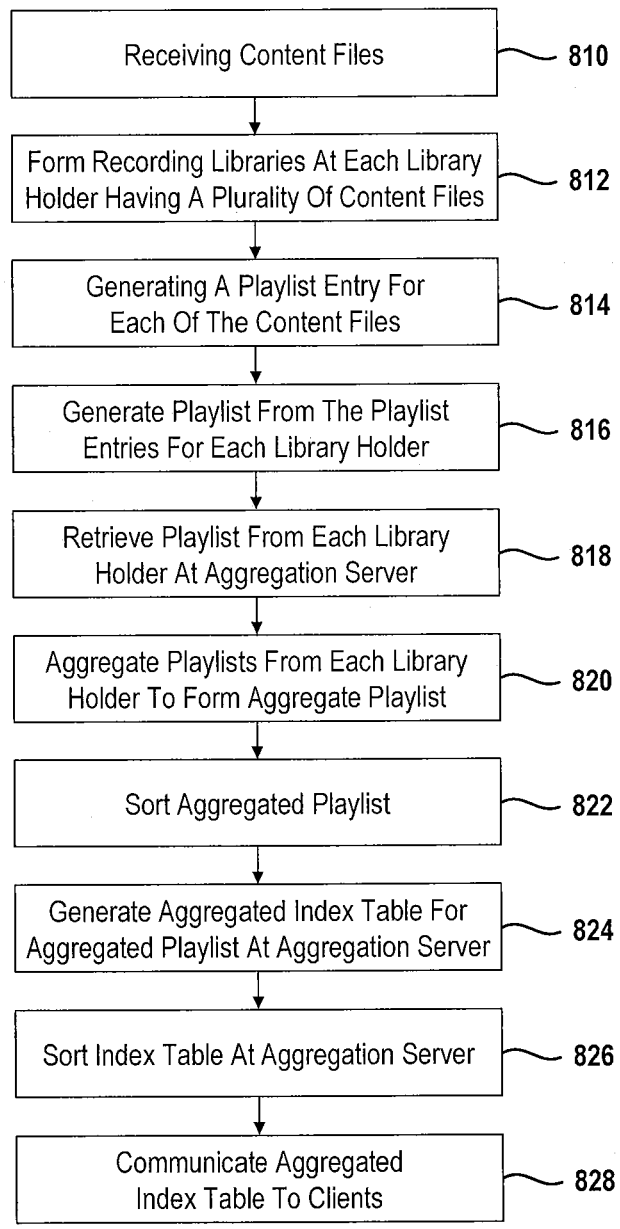
FIG. 8 is a flowchart of a method for receiving and processing content for a playlist.

Referring now to FIG. 8, a method for operating the system is set forth. In step 810, a set top box having a library holder receives content files. In step 812, a recording library is formed at each library holder that has a plurality of content files. The recording libraries 812 may be stored within a digital video recorder. In step 814 a playlist entry may be generated for each of the content files. The playlist entries may correspond to the entries described above with respect to the cache table 610. In step 816 the playlist is generated from the playlist entries for each library holder.

In step 818 the aggregation server retrieves the playlist from each library holder. In step 820, the playlists are aggregated from each of the library holders to form an aggregated playlist. In step 822 the playlist may be sorted. The playlist may be sorted according to various sort criteria including alphabetical, numerical or the like. The index table is stored within the aggregation server. In step 826 the index table may also be sorted at the aggregation server. In step 828 the aggregated index table that corresponds to the aggregated playlist may be communicated to the aggregation clients.

Figure 9:
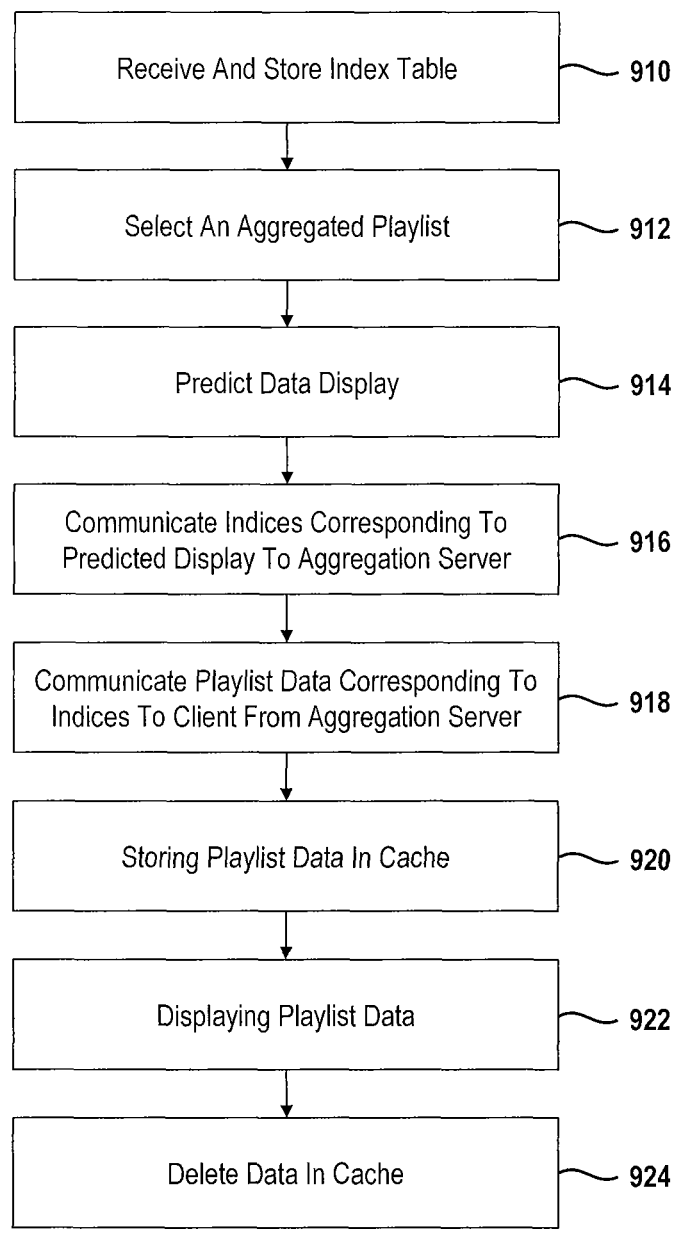
FIG. 9 is a flowchart of a method for displaying the playlist on an aggregation client.

Referring now to FIG. 9, the operation of aggregation client is set forth. In step 910 the index table having a plurality of indices is communicated to the aggregation server to the aggregation client. In step 910 the index table is received and stored within the aggregation client. In step 912 the user uses the remote user interface to select an aggregated playlist. However, as mentioned above the entire aggregated playlist may not be stored within the aggregation client but rather the index table.

In step 914 the data display associated with the index table is predicted. Only a certain number of rows of the aggregated playlist may be displayed.

Step 914 attempts to predict the movement of the screen display so that the next available playlist content is available from the cache. The movement refers to the relative movement of visible data of the display area. In step 916 the indices within the index table or list that correspond to the predicted display are communicated to the aggregation server.

In step 918 the playlist data corresponding to the indices that are about to be displayed are communicated to the client from the aggregation server.

In step 920 the playlist data is stored within a cache. In step 922 the playlist is displayed on the display that is associated with the aggregation client. In step 924 the cache data may be deleted when no longer needed. As mentioned above, the aggregation clients may be a simple client with very small amounts of memory. The cache data may thus be deleted when it is predicted that the cache data is no longer required. This allows the cache to be freed for other predicted data.

Figure 10:
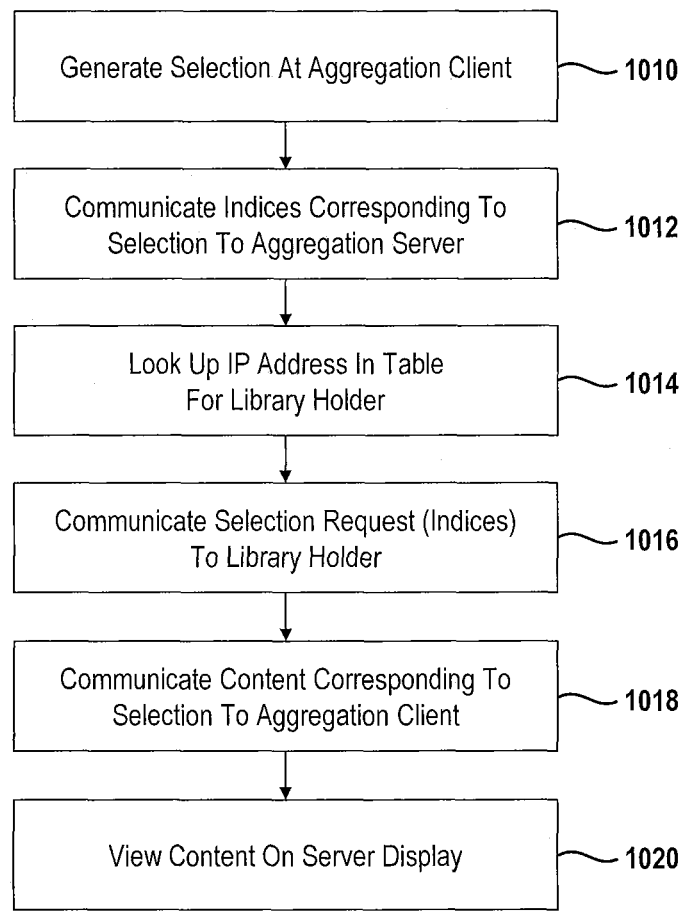
FIG. 10 is a flowchart of a method for receiving content.

Referring now to FIG. 10, after a playlist is communicated to the aggregation client, the aggregation client may then request a content selection from a storage device or a library holder. In step 1010 a selection is formed at the aggregation client. The selection is formed by making a selection with a graphical user interface such as the menu of the playlist that is displayed. A remote control device or push buttons are selected or depressed to form a selection signal. In step 1012 the indices that correspond to the selection are communicated to the aggregation server. The indices correspond to the playlist selection highlighted on the screen display. The indices within the index table may include the library holder identifier and the recording ID which is mapped at the integration server.

In step 1014 the IP address of the library holder may be looked up in a look up table within the aggregation server. In step 1016 the selection request or indices such as the recording identifier may be communicated to the library holder. It should be noted that the indices may also include a parent identifier which links the item to a folder within the library holder. In step 1018 content corresponding to the selection is communicated from the library holder to the aggregation client. The communication between the library holder and the aggregation client may be performed directly through the local area network. That is, the library holder may communicate directly with the aggregation client without the aggregation server acting as an intermediary. In step 1020 the content may be viewed directly on the screen display. The aggregation client may allow for some buffering to mask temporary slow downs in the network.

Referring now to FIG. 11, an example of an aggregated playlist is set forth. In this example, the aggregated playlist includes a date column, a title column, and a description column. However, various other types of columns and data may be provided. In this example, the columns are sorted in date order. However, the titles may also be sorted in a different order, such as title order. Contents from the playlist may be obtained from one or more library holders.

The aggregated playlist 1110 may have a selection box 1112 that highlights a particular content. The selection box 1112 may, for example, be moved using arrow keys on a remote control. The selection box in the present example corresponds to a date of June 12, a title "Junior Golf Championship" and a description "Ben Mierzwa Hosts This Golf Classic." The titles and descriptions may have various lengths that may be limited by system requirements. The arrow keys may move the selections up or down. Arrow keys 1114 and 1116 toward the bottom of the screen display may allow the aggregated playlist to scroll up and down. As the aggregated playlist is scrolled down, indices within the aggregated client are communicated to the aggregation server so that playlist data may be communicated to the cache of the aggregated client so that the playlist data is ready to be displayed when required.

After moving the selection box 1112 to a desired location, an enter key or selection key on a remote control or keypad on the set top box may be selected. The indices corresponding to the playlist title are communicated back to the aggregation server from which the library holder is requested to transfer the content to the aggregation client as described in FIG. 10.

Figure 12:
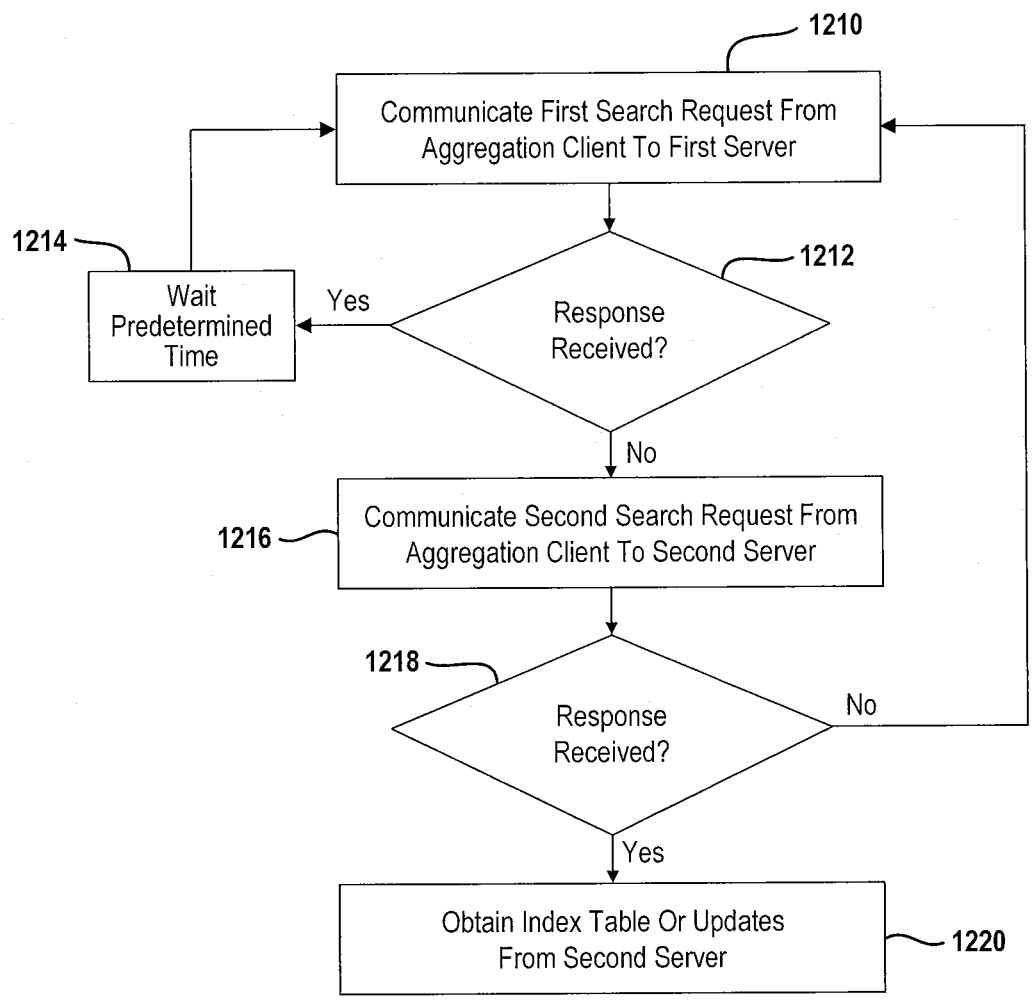
FIG. 12 is a flowchart of a method for finding a server within the network.

Referring now to FIG. 12, communication between the aggregation client and aggregation server must be maintained. This allows the aggregation client to receive updates as the playlists change. In step 1210 the first search request is communicated from the aggregation client to the first server. The first search request is a search for an aggregation server. The search request may be communicated periodically. In step 1212 if a response from the aggregation client is received, the system may wait a predetermined time in step 1214 before sending another search request. In this manner the aggregation client maintains communication with the aggregation server.

In step 1212 if a response is not received step 1216 communicates a search request to a second server if a response is not received in step 1218, step 1210 is then again performed. In step 1218 if a response is received then an index table or updates are communicated from the second server in step 1220.

The process in FIG. 12 presumes that a second server is found on the network. If a second server is not found on the network steps 1210 through 1214 are continually performed.

Figure 13:
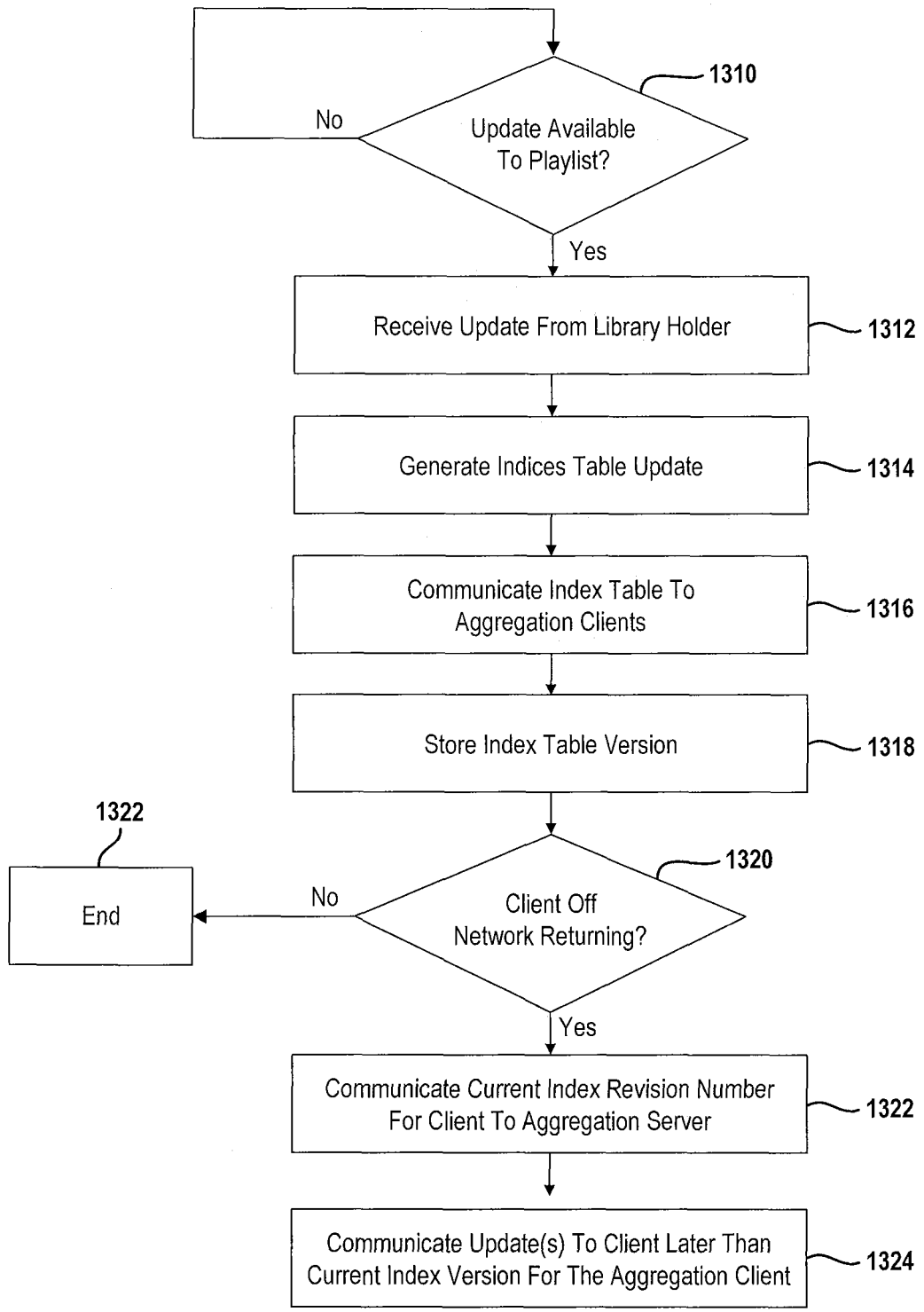
FIG. 13 is a flowchart for a method for updating a playlist.

Referring now to FIG. 13, when updates are available, the updates may be provided in versions to the aggregation clients. In step 1310, it is determined whether an update is available to the playlist. If an update is available, an update is received from the library in step 1312. In step 1314 an indices table update may be generated that corresponds to the update. In step 1316 the index update version may be communicated to the aggregation clients. The index update versions may be communicated to the aggregation clients as generated. The aggregation clients may store the various versions in step 1318. In step 1320 if a client is off the network and is not returning, step 1322 ends the process. If the client is off the network and is returning step 1322 communicates the current index revision number from the client to the aggregation server. In step 1324 the updates or update version or versions are communicated to the client that are later than the current index version for the aggregation client. That is, the aggregation client may then receive all of the versions up to the previous version when coming back into the network.

Figure 14:
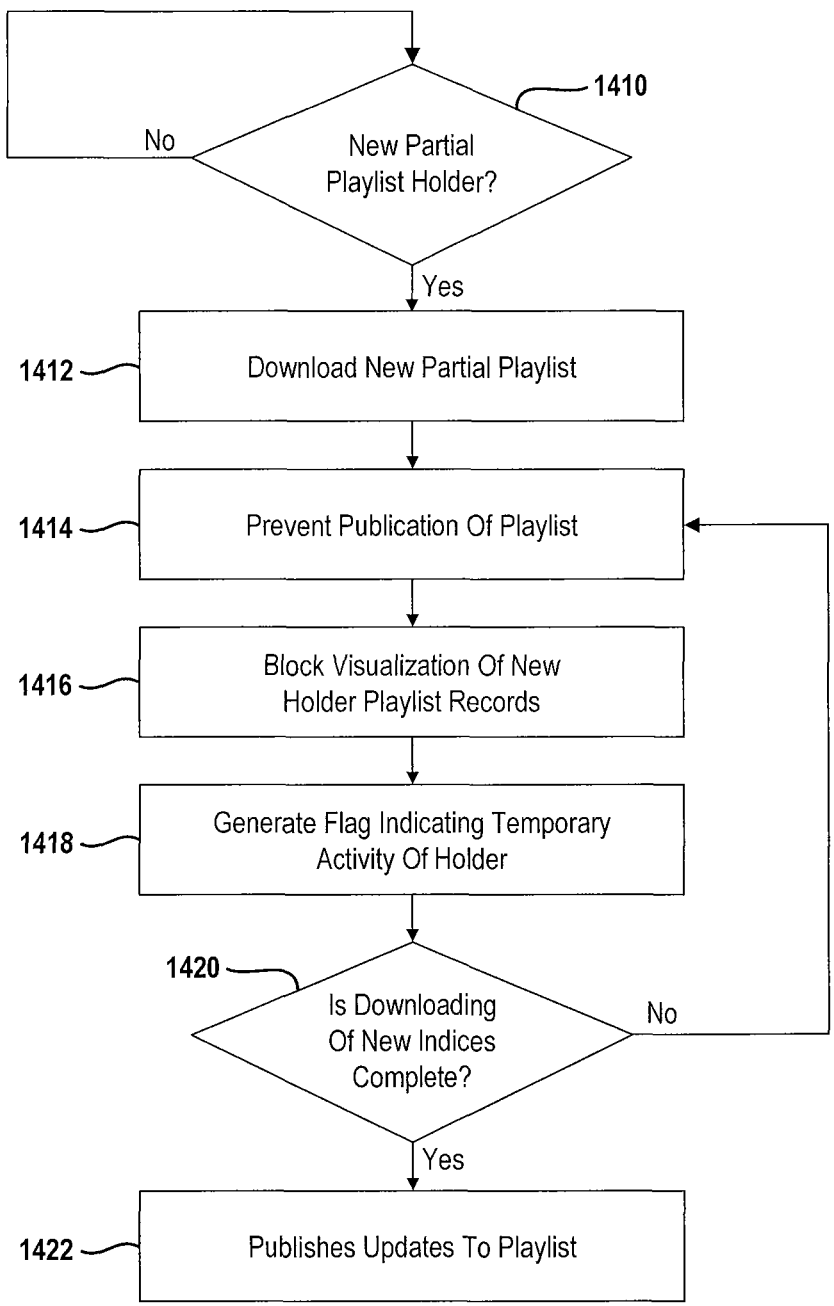
FIG. 14 is a method for blocking access to an updating playlist.

Referring now to FIG. 14, when a partial playlist joins the network, step 1410 determines whether a new partial playlist holder is joining the network. In step 1412 the partial playlist is downloaded from the library holder to the aggregation server. Step 1412 initiates the download process. In step 1414 the publication of the playlist through the indices to the aggregation client may be prevented. In step 1416 the visualization of the new record holder playlist records may be blocked from visualization at the aggregation client. In step 1418 a flag indicating the temporary activity the holder may be generated. In step 1420 if the downloading of the playlist is complete, step 1422 publishes the playlist. By publishing, the playlist updates may be provided to the aggregation clients having a new version of the index table that correspond to the new entries from the added library holder.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A method comprising:
   forming a first playlist having first playlist data corresponding to stored content within a first storage device;
   forming a second playlist having second playlist data corresponding to stored content within a second storage device;
   communicating the first playlist and the second playlist to an aggregation server;
   aggregating the first playlist data and the second playlist data to form an aggregated playlist having aggregated playlist data;
   forming an index list corresponding to the aggregated playlist; and
   communicating the index list to a first aggregation client.

2. A method as recited in claim 1 further comprising sorting the index list at the first aggregation client.

3. A method as recited in claim 1 further comprising predicting indices from the index list that correspond to a visualization buffer.

4. A method as recited in claim 3 further comprising predicting indices comprises predicting indices larger than required for a screen display for the visualization buffer.

5. A method as recited in claim 4 further comprising requesting playlist data from the aggregation server based on the indices corresponding to the visualization buffer.

6. A method as recited in claim 1 further comprising selecting a display entry at the first aggregation client to form a selection;
   communicating indices corresponding to the selection to the aggregation server;
   communicating at least one of the indices to the first storage device; and
   communicating content corresponding to the selection from the first storage device to the first aggregation client through a network.

7. A method as recited in claim 6 wherein communicating content corresponding to the selection from the storage device to the first aggregation client through a network comprises communicating content corresponding to the selection from the storage device to the first aggregation client directly through a network.

8. A method as recited in claim 6 wherein the indices corresponding to the selection comprises a playlist holder identifier and a recording identifier.

9. A method as recited in claim 1 wherein the first aggregation client comprises a map for converting indices to a IP address for the first storage device.

10. A method as recited in claim 1 wherein the index list has a first data size less than a second data size of the aggregated playlist.

11. A method as recited in claim 1 wherein forming an index list comprises forming a first sorting key and a second sorting key for first playlist content and further comprising sorting the index list using the first sorting key at the first aggregation client.

12. A method as recited in claim 11 further comprising sorting the index list using the second sorting key at the first aggregation client.

13. A method as recited in claim 12 wherein the first sorting key corresponds to alphabetical sort.

14. A method as recited in claim 12 wherein the second sorting key corresponds to a date sort.

15. A method as recited in claim 1 further comprising changing the first playlist of the first storage device to form an updated first playlist;
   communicating the updated first playlist to the aggregation server;
   forming an updated index list corresponding to the first playlist; and
   communicating the index list to the first aggregation client.

16. A method as recited in claim 15 further comprising forming an update version corresponding to only the updated index list and communicating the update version to the first aggregation client.

17. A system comprising:
- a first storage device having a first playlist comprising first playlist data corresponding to stored content;
- a second storage device having a second playlist comprising second playlist data corresponding to stored content;
- an aggregation server in communication with the first storage device and the second storage device receiving the first playlist and the second playlist, said aggregation server aggregating the first playlist data and the second playlist data to form an aggregated playlist having aggregated playlist data, forming an index list corresponding to the aggregated playlist; and
- a first aggregation client in communication with the aggregation server receiving the index list from the aggregation server.

18. A system as recited in claim 17 wherein the first storage device and the aggregation server are each disposed within a first set top box.

19. A system as recited in claim 17 wherein the aggregation server is disposed within a first set top box and the first aggregation client is disposed within a second set top box.

20. A system as recited in claim 17 wherein the aggregation server is disposed within a computer and the first storage device is dispose within a set top box.

21. A system as recited in claim 17 wherein the first aggregation client sorts the index list.

22. A system as recited in claim 17 wherein the first aggregation client predicts indices from the index list that correspond to a visualization buffer.

23. A system as recited in claim 22 wherein the first aggregation client predicts indices larger than required for a screen display for the visualization buffer.

24. A system as recited in claim 22 wherein the first aggregation client requests playlist data from the aggregation server based on the indices corresponding to the visualization buffer.

25. A system as recited in claim 17 wherein the first aggregation client has a display associated therewith, said first aggregation client selecting a display entry and communicating indices corresponding to the selection to the aggregation server;
- said aggregation server communicating at least one of the indices to the first storage device; and
- said first storage device communicating content corresponding to the selection to the first aggregation client through a network.

26. A system as recited in claim 25 wherein the first storage device communicates content to the first aggregation client directly through a network.

27. A system as recited in claim 25 wherein the indices corresponding to the selection comprise a playlist holder identifier and a recording identifier.

28. A system as recited in claim 17 wherein the first aggregation client comprises a map for converting indices to a IP address for the first storage device.

29. A system as recited in claim 17 wherein the index list has a first data size less than a second data size for the aggregated playlist.

30. A system as recited in claim 17 wherein the index list comprises a first sorting key and a second sorting key and wherein the first aggregation client sorts the index list using the first sorting key at the first aggregation client.

31. A system as recited in claim 30 wherein the first sorting key corresponds to alphabetical sort.

32. A system as recited in claim 30 wherein the second sorting key corresponds to a date sort.

33. A system as recited in claim 17 wherein the first storage device changes the first playlist to form an updated first playlist and communicates the updated first playlist to the aggregation server;
- said aggregation server forming an updated index list corresponding to the first playlist and communicating the index list to the first aggregation client.

34. A system as recited in claim 33 wherein the aggregation server forms an update version corresponding to only the updated index list and wherein the aggregation sever communicates the update version to the first aggregation client.

* * * * *